(12) United States Patent
Horne

(10) Patent No.: US 7,971,249 B2
(45) Date of Patent: *Jun. 28, 2011

(54) SYSTEM AND METHOD FOR SCANNING MEMORY FOR PESTWARE OFFSET SIGNATURES

(75) Inventor: Jefferson Delk Horne, Boulder, CO (US)

(73) Assignee: Webroot Software, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,434

(22) Filed: Sep. 14, 2009

(65) Prior Publication Data

US 2010/0005530 A1 Jan. 7, 2010

Related U.S. Application Data

(63) Continuation of application No. 11/105,977, filed on Apr. 14, 2005, now Pat. No. 7,591,016.

(51) Int. Cl.
G06F 12/14 (2006.01)

(52) U.S. Cl. ............... 726/22; 713/188; 726/23; 726/24

(58) Field of Classification Search .............. 726/22–25; 713/188, 164–167; 711/200; 714/100, 5, 714/25, 29, 39, 47
See application file for complete search history.

(56) References Cited

U.S. PATENT DOCUMENTS

| 5,442,669 | A | 8/1995 | Medin |
|---|---|---|---|
| 5,485,575 | A | 1/1996 | Chess et al. |
| 5,696,822 | A | 12/1997 | Nachenberg |
| 5,826,013 | A | 10/1998 | Nachenberg |
| 6,192,512 | B1 | 2/2001 | Chess |
| 6,253,258 | B1 | 6/2001 | Cohen |
| 6,357,008 | B1 | 3/2002 | Nachenberg |
| 6,457,174 | B1 | 9/2002 | Kuroda |
| 6,681,972 | B1 | 1/2004 | Tapocik |
| 6,735,703 | B1 | 5/2004 | Kilpatrick |
| 6,775,780 | B1 | 8/2004 | Muttik |
| 6,851,057 | B1 | 2/2005 | Nachenberg |
| 6,931,540 | B1 | 8/2005 | Edwards |
| 6,971,019 | B1 | 11/2005 | Nachenberg |
| 6,973,577 | B1 | 12/2005 | Kouznetsov |

(Continued)

OTHER PUBLICATIONS

DIMVA 2005 (2005 : Vienna, Austria), Detection of intrusions and malware, and vulnerability assessment : second international conference, DIMVA 2005, Vienna, Austria, Jul. 7-8, 2005 : proceedings / Klaus Julisch, Christopher Kruegel (eds.). Berlin ; New York : Springer, 2005. x, 240 p. : ill. ; 24 cm. pp. 1-18, 174-187.

(Continued)

*Primary Examiner* — Nirav B Patel
(74) *Attorney, Agent, or Firm* — Faegre & Benson LLP

(57) ABSTRACT

Systems and methods for managing pestware processes on a protected computer are described. In one implementation, a reference point in the executable memory that is associated with a process running in the executable memory is located. A first and second sets of information from corresponding first and second portions of the executable memory are then retrieved. The first and second portions of the executable memory are separated by a defined offset, and each of the first and second portions of the executable memory are offset from the reference point. The process is identifiable as a particular type of pestware when the first and second sets of information each include information previously found to be separated by the defined offset in other processes that are of the particular type of pestware. In some variations, the reference point is a starting address and/or an API implementation in the process.

18 Claims, 3 Drawing Sheets

U.S. PATENT DOCUMENTS

| | | | |
|---|---|---|---|
| 6,973,578 | B1 | 12/2005 | McIchionc |
| 7,150,045 | B2 | 12/2006 | Koelle |
| 7,155,742 | B1 | 12/2006 | Szor |
| 7,171,690 | B2 | 1/2007 | Kouznetsov |
| 7,178,166 | B1 | 2/2007 | Taylor |
| 7,216,367 | B2 | 5/2007 | Szor |
| 7,349,931 | B2 | 3/2008 | Horne |
| 7,571,476 | B2 | 8/2009 | Horne |
| 7,591,016 | B2 | 9/2009 | Horne |
| 2002/0120871 | A1 | 8/2002 | Watkins |
| 2003/0023865 | A1 | 1/2003 | Cowie |
| 2003/0046558 | A1 | 3/2003 | Teblyashkin |
| 2003/0074573 | A1 | 4/2003 | Hursey |
| 2003/0110391 | A1 | 6/2003 | Wolff |
| 2003/0115479 | A1 | 6/2003 | Edwards |
| 2003/0120952 | A1 | 6/2003 | Tarbotton |
| 2003/0212902 | A1 | 11/2003 | Made van der |
| 2003/0217286 | A1 | 11/2003 | Carmona |
| 2003/0233566 | A1 | 12/2003 | Kouznetsov |
| 2004/0015712 | A1 | 1/2004 | Szor |
| 2004/0030912 | A1 | 2/2004 | Merkle |
| 2004/0068664 | A1 | 4/2004 | Nachenberg |
| 2004/0199827 | A1 | 10/2004 | Muttik |
| 2004/0243829 | A1 | 12/2004 | Jordan |
| 2004/0255165 | A1 | 12/2004 | Szor |
| 2005/0021994 | A1 | 1/2005 | Barton |
| 2005/0039029 | A1 | 2/2005 | Shipp |
| 2005/0055558 | A1 | 3/2005 | Carmona |
| 2005/0071649 | A1 | 3/2005 | Shipp |
| 2005/0154900 | A1 | 7/2005 | Muttik |
| 2005/0172337 | A1 | 8/2005 | Bodorin |
| 2005/0172338 | A1 | 8/2005 | Sandu |
| 2005/0188272 | A1 | 8/2005 | Bodorin |
| 2005/0223238 | A1 | 10/2005 | Schmid |
| 2005/0262567 | A1 | 11/2005 | Carmona |
| 2005/0268112 | A1 | 12/2005 | Wang |
| 2005/0268338 | A1 | 12/2005 | Made van der |
| 2005/0278783 | A1 | 12/2005 | Chien |
| 2005/0278785 | A1 | 12/2005 | Lieberman |
| 2005/0283838 | A1 | 12/2005 | Saito |
| 2006/0112235 | A1 | 5/2006 | Cabot |
| 2006/0123244 | A1 | 6/2006 | Gheorghescu |
| 2006/0200863 | A1 | 9/2006 | Ray et al. |

OTHER PUBLICATIONS

Erbschloe, Trojans, Worms, and Spyware: A Computer Security Professional's Guide to Malicious Code, MA: Elsevier Butterworth-Heinemann, 2005. pp. 185-189.

Harley, et al., Viruses Revealed, CA: Osborne/McGraw-Hill Publishers, 2001. pp. 219-225, 228-229.

Linn, et al., Obfuscation of Executable Code to Improve Resistance to Static Disassembly, 2003, ACM, pp. 290-299.

List of Several Anti-Spyware Vendors/Producers appearing prominently on the Internet (current date).

Milenkovic' et al., "Using instruction block signatures to counter code injection attacks" (article)., ACM SIGARCH Computer Architecture News archive, vol. 33, Issue 1 (Mar. 2005). Special issue: Workshop on architectural support for security and anti-virus (WASSA) table of contents, pp. 108-117 Year of Publication: 2005 ISSN:0163-5964. ACM Press. New York, NY.

Nachenberg, "Computer virus-antivirus coevolution", Communications of the ACM archive. vol. 40, Issue 1 (Jan. 1997), pp. 46-51, ISSN:0001-0782 Symantec Antivirus Research Center, Symantec Corp., Santa Monica, Calif. ACM Press, New York, NY.

Rabek et al, "Detection of injected, dynamically generated, and obfuscated malicious code" Source Workshop on Rapid Malcode archive; Proceedings of the 2003 ACM workshop on Rapid malcode table of contents Washington, DC, USA Session: Defensive technology pp. 76-82 Year of Publication: 2003 ISBN:1-58113-785-0 Sponsors—SIGSAC: ACM Special Interest Group on Security, Audit, and Control, ACM Press, New York, NY.

Singh et al., "Analysis and detection of computer viruses and worms: an annotated bibliography", ACM SIGPLAN Notices archive, vol. 37, Issue 2 (Feb. 2002) COLUMN: Technical correspondence, pp. 29-35, ISSN:0362-1340, ACM Press New York, NY, USA.

Skoudis, Ed., Malware : fighting malicious code / Ed Skoudis with Lenny Zeltser. NJ : Prentice Hall Professional Technical Reference, c2004. xxii, 647 p. : ill. ; 24 cm. pp. 590-601, 615-618.

Tittel, Ed., PC magazine fighting spyware, viruses, and malware / Ed Tittel. Indianapolis, IN : Wiley Pub., c2005. xv, 367 p. : ill. ; 24 cm. pp. 328-330, 334-335.

Whittaker et al., "Neutralizing windows-based malicious mobile code", Symposium on Applied Computing archive Proceedings of the 2002 ACM symposium on Applied computing, Madrid, Spain. SESSION: Computer security table of contents pp. 242-246 Year of Publication: 2002 ISBN:1-58113-445-2. Sponsor: SIGAPP: ACM Special Interest Group on Applied Computing. ACM Press,New York, NY.

International Search Report dated Jul. 17, 2007 for PCT Application No. PCT/US 06/14003.

International Search Report dated Jan. 22, 2007 for PCT Application No. PCT/US 06/14004.

Office Action dated Apr. 6, 2007 for U.S. Appl. No. 11/105,977.

Office Action dated Sep. 20, 2007 for U.S. Appl. No. 11/106,122.

Notice of Allowance dated Oct. 4, 2007 for U.S. Appl. No. 11/105,978.

International Search Report dated Nov. 29, 2007 for PCT Application No. PCT/US 06/14405.

Office Action dated Dec. 19, 2007 for U.S. Appl. No. 11/105,978.

Office Action dated Dec. 28, 2007 for U.S. Appl. No. 11/105,977.

Notice of Allowance dated Mar. 5, 2009 for U.S. Appl. No. 11/106,122.

Notice of Allowance dated Jul. 28, 2009 for U.S. Appl. No. 11/105,977.

SYSTEM AND METHOD FOR SCANNING MEMORY FOR PESTWARE OFFSET SIGNATURES

RELATED APPLICATIONS

The present application is a continuation of application Ser. No. 11/105,977, entitled System and Method for Scanning Memory For Pestware Offset Signatures filed Apr. 14, 2005, and related to the following commonly owned and assigned applications: application Ser. No. 11/105,978, entitled System and Method for Scanning Obfuscated Files for Pestware filed Apr. 14, 2005; application Ser. No. 11/106,122, entitled System and Method for Scanning Memory for Pestware, filed Apr. 14, 2005, each of which is incorporated by reference in their entirety.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect some pestware, but many variations of pestware are difficult to detect with typical techniques. For example, pestware running in memory of a computer is often difficult to detect because it is disguised in such a way that it appears to be a legitimate process that is dependent from a trusted application (e.g., a word processor application). In other cases, pestware is obfuscated with encryption techniques so that a pestware file stored on a system hard drive may not be readily recognizable as a file that has spawned a pestware process. In yet other instances, pestware is known to be polymorphic in nature so as to change its size in memory or to change its starting address in memory. Accordingly, current software is not always able to scan and remove pestware in a convenient manner and will most certainly not be satisfactory in the future.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention include methods for scanning files of a protected computer for pestware. One embodiment is configured to locate a reference point in the executable memory that is associated with a process running in the executable memory and retrieving a first set of information from a first portion of the executable memory and a second set of information from a second portion of the executable memory. The first and second portions of the executable memory are separated by a defined offset, and each of the first and second portions of the executable memory are offset from the reference point. The process is identified as a particular type of pestware when the first and second sets of information each include information previously found to be separated by the defined offset in other processes that are of the particular type of pestware.

In another embodiment, the invention may be characterized as a system for managing pestware. In this embodiment, a pestware detection module is configured to detect pestware on a protected computer, which includes a file storage device and a program memory. The system also includes a pestware removal module configured to remove pestware on the protected computer. In this embodiment, the pestware detection module configured to locate a reference point in the executable memory that is associated with a process running in the executable memory and to retrieve a first set of information from a first portion of the executable memory and a second set of information from a second portion of the executable memory. The first and second portions of the executable memory are separated by a defined offset, and each of the first and second portions of the executable memory are offset from the reference point. The pestware detection module is configured to identify the process as a particular type of pestware when the first and second sets of information each include information previously found to be separated by the defined offset in other processes that are of the particular type of pestware.

These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
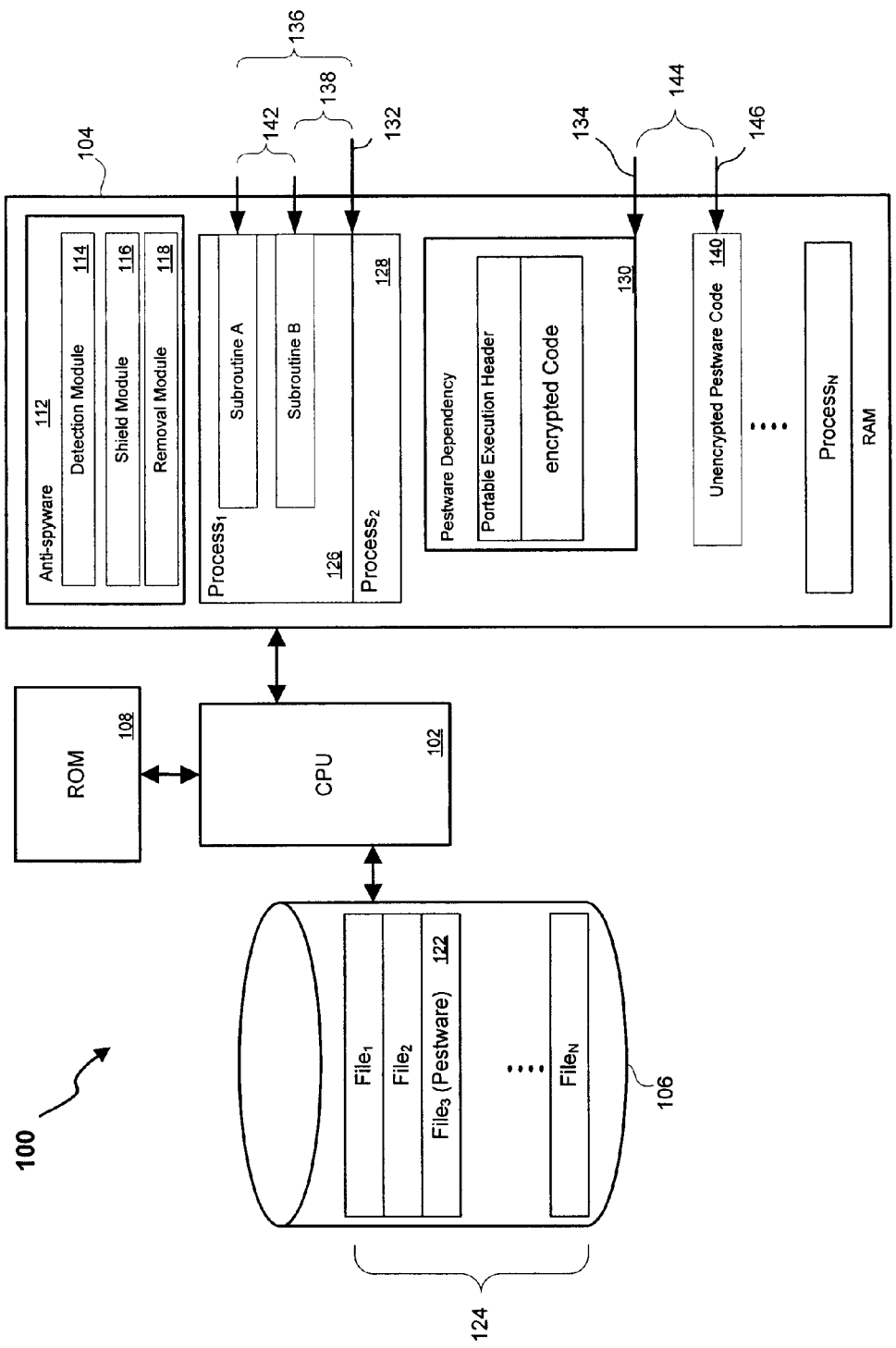
FIG. 1 illustrates a block diagram of a protected computer in accordance with one implementation of the present invention.

Referring first to FIG. 1, shown is a block diagram 100 of a protected computer/system in accordance with one implementation of the present invention. The term "protected computer" is used herein to refer to any type of computer system, including personal computers, handheld computers, servers, firewalls, etc. This implementation includes a CPU 102 coupled to memory 104 (e.g., random access memory (RAM)), a file storage device 106 and ROM 108.

As shown, the storage device 106 provides storage for a collection of N files 124, which includes a pestware file 122. The storage device 106 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 106, which is depicted for convenience as a single storage device, may be realized by multiple (e.g., distributed) storage devices.

As shown, an anti-spyware application 112 includes a detection module 114, a shield module 116 and a removal module 118, which are implemented in software and are executed from the memory 104 by the CPU 102. The software 112 can be configured to operate on personal computers (e.g., handheld, notebook or desktop), servers or any device capable of processing instructions embodied in executable code. Moreover, one of ordinary skill in the art will recognize that alternative embodiments, which implement one or more components (e.g., the anti-spyware 112) in hardware, are well within the scope of the present invention.

Also shown in the executable memory 104 are N processes, which in general, are executable programs that may be either known and trusted applications or pestware processes that are being executed by the CPU 102. Shown among the N processes for example, are a first process 126 that is a pestware process and a second process 128 that is not a pestware process, but it is associated with a pestware dependency 130, which has spawned unencrypted pestware code 140. As discussed further herein with reference to FIGS. 2 and 3, several embodiments of the present invention effectively and quickly identify and remove the pestware 126, 130, 140.

It should be recognized that an operating system (not shown) of the protected computer 100 is not limited to any particular type of operating system and may be operating systems provided by Microsoft Corp. under the trade name WINDOWS (e.g., WINDOWS 2000, WINDOWS XP, and WINDOWS NT). Additionally, the operating system may be an open source operating system such operating systems distributed under the LINUX trade name. For convenience, however, embodiments of the present invention are generally described herein with relation to WINDOWS-based systems. Those of skill in the art can easily adapt these implementations for other types of operating systems or computer systems.

Figure 2:
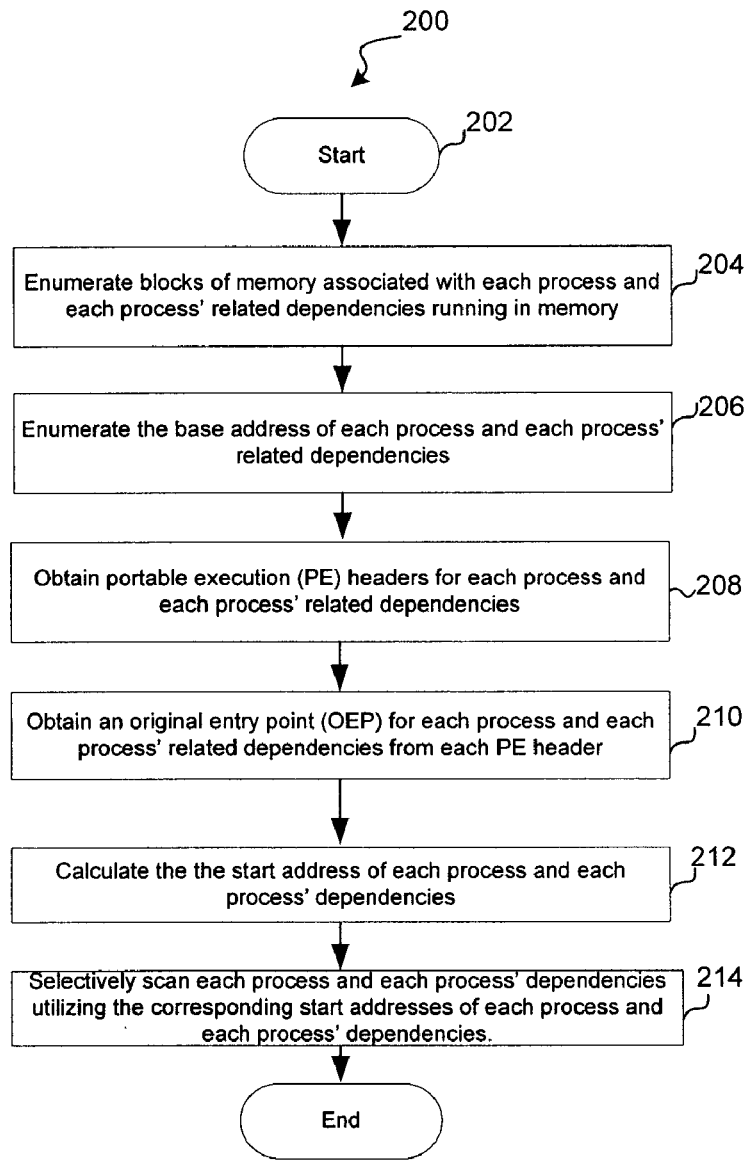
FIG. 2 is a flowchart of one method for locating portions of memory associated with processes and process dependencies running in memory of the protected computer.

Referring next to FIG. 2, shown is a flowchart depicting steps traversed in accordance with a method for scanning processes (e.g., the N processes) in executable memory for pestware. In the exemplary embodiment, the steps enumerated in FIG. 2 are carried out by the detection module 114 of the anti-spyware application 112. As shown in FIG. 2, blocks of memory associated with the N processes and any dependencies associated with each process are initially enumerated (Blocks 202, 204). In addition, the base address of each of the N processes and any dependencies associated with each of the N processes are enumerated (Block 206). With respect to the exemplary processes depicted in FIG. 1, blocks of memory and the base addresses associated with the N processes and the pestware dependency 130 are enumerated.

As shown in FIG. 2, once the base addresses for the processes and dependencies are identified, portable execution (PE) headers for the processes and dependencies are obtained (Block 208), and the original entry point (OEP) for each process and each dependency are obtained from the processes' and dependencies' respective portable execution headers (Block 210). Next, the start address of each process and each dependency is calculated by adding the OEP and base address of each process and each dependency together (Block 212).

Referring to FIG. 1, for example, a start address 132 of the first pestware process 126 is calculated and another start address 134 of the pestware dependency 130 is calculated. Advantageously, the steps outlined with reference to blocks 202-212 allow a reference point in executable memory (e.g., memory 104) to be established relative to processes and dependencies that have neither a corresponding file in the file storage device 106 nor have a process identifier (PID). For example, the pestware dependency 130 may be a dynamic link library (DLL), that does not have a process PID, but several embodiments of the present invention enable the block of memory associated with the DLL to be enumerated and allow a base reference point (e.g., the start address 134) for the dependency 130 to be identified.

After calculating the start addresses of the processes (e.g., the N processes) and any dependencies (e.g., the dependency 130) each of the processes and any dependencies are scanned utilizing their respective start addresses (Block 214). It should be recognized that, due to various techniques (e.g., morphing techniques) the calculated starting address discussed above with reference to block 212 may not yield a viable base location from which to scan the associated process/dependency. To address this situation, some embodiments of the present invention also locate one or more API implementations, which are then utilized as a reference point to scan the associated process.

Figure 3:
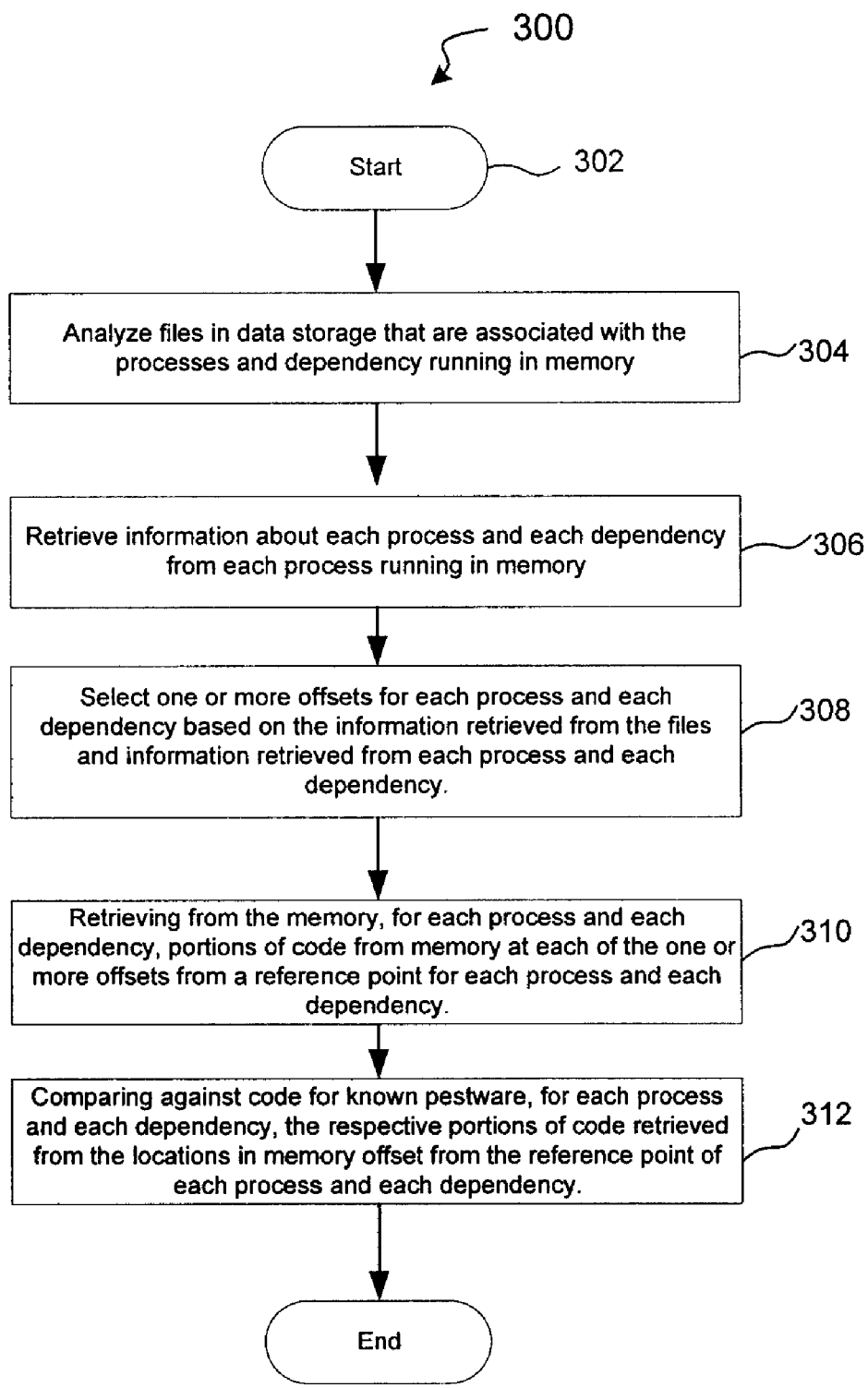
FIG. 3 is a flowchart of a method for scanning the processes and process dependencies so as to identify pestware running on the protected computer.

Referring next to FIG. 3, shown is a flowchart depicting steps carried out in accordance with a dynamic offset scanning technique in accordance with several embodiments of the present invention. In general, the offset scanning technique in these embodiments scans, utilizing offsets from a base location (e.g., a start address and/or an API implementation) only portions of the executable memory that are associated with each of the processes (e.g., the N processes) so as to scan the processes quickly. But the portions of the executable memory that are scanned are selected so as to provide for very effective scanning. Moreover, in many variations of the present invention, the information obtained from the selected portions of the executable memory is op code that provides very specific information about the processes so as to avoid false positives.

As shown in FIG. 3 with simultaneous reference to FIG. 1, in several embodiments, portions of the files in storage device 106 are scanned along with portions of the N processes and the dependency 130 in memory 104 so as to provide an initial assessment the types of processes that are residing in the executable memory 104 (Blocks 302, 304, 306).

Based upon the information gathered with the initial scans (Blocks 304, 306), specific offsets are selected for scanning each of the N processes and the dependency 130 (Block 308). For example, a partial scan of the pestware dependency 130 reveals that it is a loader for encrypted code, and as a consequence, a specific offset 144 from the start address 134 of the pestware dependency 130 to a memory location 146 that is outside of the memory block for the pestware dependency 130 is selected in order to scan for unencrypted pestware code known to be located at the offset 144 from its associated loader when running in memory.

As another example, a first offset 136 and a second offset 138 are selected relative to the start address 132 of the first pestware process 126. As shown, these offsets 136, 138 from the start address 132 point to portions of the executable memory 104 where two specific subroutines for the first pestware process reside. These offsets 136 and 138 are selected based upon known pestware of the type matching the first pestware process 126.

It should be recognized that other base reference locations may be utilized for the processes and dependencies in addition to (or instead of) a start address. For example, it is often the case that a relative offset between portions of code within a pestware process is static even though the start address of the process may vary. In some embodiments for example, API implementations are located and utilized as base reference points when the start address is not a viable reference point. In such a case, one or more offsets from the API implementation may be scanned for code that is known to be associated with particular pestware.

As shown in FIG. 3, for each process and each dependency, portions of code are retrieved from locations in memory that are located at the selected offsets from the base reference location associated with each process and each dependency (Block 310). The code that is retrieved from memory at the locations that are offset from a reference base of a particular process/dependency is then compared with code associated with known pestware so as to determine whether the particular process/dependency is pestware (Block 312).

In several embodiments, the code retrieved at the offsets is op code (e.g., X86 assembly instructions) as opposed to strings or flat Unicode text. In this way, the identification of pestware is much more accurate because the op code associated with known pestware is very specific to the pestware. As a consequence, the frequency of false positive identifications of the process as pestware is substantially reduced.

It should be recognized that the process depicted in FIG. 3 is exemplary only and that one of ordinary skill in the art will appreciate that one or more steps may be varied and or omitted without departing from the scope of the present invention. For example, the steps enumerated by blocks 304 and 306 may be varied or omitted, and each process/dependency may be scanned by scanning memory associated with each process/dependency with various offsets from the base reference point of the process/dependency without the benefit of narrowing the number of offsets utilized.

In conclusion, the present invention provides, among other things, a system and method for managing pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for scanning executable memory of a protected system for pestware comprising:
   locating a reference point in the executable memory that is associated with a process being executed by a computer via the executable memory;
   retrieving a first set of information from a first portion of the executable memory and a second set of information from a second portion of the executable memory, wherein the first and second portions of the executable memory are separated by a defined offset based on a predetermined type of pestware, and wherein each of the first and second portions of the executable memory are offset from the reference point; and
   identifying the process as the predetermined type of pestware when the first and second sets of information each include information previously found to be separated by the defined offset in other processes that are specific to the predetermined type of pestware wherein the second set of information is derived from the first set of information upon execution of the first set of information in the executable memory.

2. The method of claim 1, wherein the locating the reference point includes locating a starting address of the process.

3. The method of claim 1, wherein the locating the reference point includes locating an API implementation in the process.

4. The method of claim 1, wherein the retrieving includes retrieving op code from the first and second portions of the executable memory.

5. The method according to claim 1, wherein
   the defined offset is based on the predetermined type of pestware, and
   the process is identified as the predetermined type of pestware when the first and second sets of information each include information previously found to be separated by the defined offset in other processes that are specific to the predetermined type of pestware.

6. The method according to claim 1, further comprising:
   analyzing the first set of information;
   identifying the first set of information as being associated with the predetermined type of pestware; and
   selecting the defined offset based on the analyzed first set of information.

7. A system for managing pestware comprising:
   a protected computer;
   a pestware removal module configured to remove pestware on the protected computer, the protected computer including at least one file storage device and an executable memory; and
   a pestware detection module configured to:
      locate a reference point in the executable memory that is associated with a process being executed by the protected computer via the executable memory;
      retrieve a first set of information from a first portion of the executable memory and a second set of information from a second portion of the executable memory, wherein the first and second portions of the executable memory are separated by a defined offset based on a predetermined type of pestware, and wherein each of the first and second portions of the executable memory are offset from the reference point; and
      identify the process as the predetermined type of pestware when the first and second sets of information each include information previously found to be separated by the defined offset in other processes that are specific to the predetermined type of pestware, wherein the second set of information is derived from the first set of information upon execution of the first set of information in the executable memory.

8. The system of claim 7, wherein the pestware detection module is configured to locate a starting address as the reference point.

9. The system of claim 7, wherein the pestware detection module is configured to locate an API implementation as the reference point.

10. The system of claim 7, wherein the pestware detection module is configured to retrieve op code from the first and second portions of the executable memory.

11. The system according to claim 7, wherein
the defined offset is based on the predetermined type of pestware, and
the process is identified as the predetermined type of pestware when the first and second sets of information each include information previously found to be separated by the defined offset in other processes that are specific to the predetermined type of pestware.

12. The system according to claim 7, wherein the pestware detection module is further configured to:
analyze the first set of information;
identify the first set of information as being associated with the predetermined type of pestware; and
select the defined offset based on the analyzed first set of information.

13. A non-transitory computer readable storage medium storing instructions for scanning executable memory on a protected computer for pestware, the instructions including instructions for:
locating a reference point in the executable memory that is associated with a process being executed by the protected computer via the executable memory;
retrieving a first set of information from a first portion of the executable memory and a second set of information from a second portion of the executable memory, wherein the first and second portions of the executable memory are separated by a defined offset based on a predetermined type of pestware, and wherein each of the first and second portions of the executable memory are offset from the reference point; and
identifying the process as the predetermined type of pestware when the first and second sets of information each include information previously found to be separated by the defined offset in other processes that are specific to the predetermined type of pestware wherein the second set of information is derived from the first set of information upon execution of the first set of information in the executable memory.

14. The non-transitory computer readable medium of claim 13, wherein the instructions for locating the reference point include instructions for locating a starting address of the process.

15. The non-transitory computer readable medium of claim 13, wherein the instructions for locating the reference point include instructions for locating an API implementation in the process.

16. The non-transitory computer readable medium of claim 13, wherein the instructions for retrieving include instructions for retrieving op code from the first and second portions of the executable memory.

17. The non-transitory computer readable storage medium according to claim 13, wherein
the defined offset is based on the predetermined type of pestware, and
the process is identified as the predetermined type of pestware when the first and second sets of information each include information previously found to be separated by the defined offset in other processes that are specific to the predetermined type of pestware.

18. The non-transitory computer readable storage medium according to claim 13, wherein the instructions further include instructions for:
analyzing the first set of information;
identifying the first set of information as being associated with the predetermined type of pestware; and
selecting the defined offset based on the analyzed first set of information.

* * * * *